United States Patent
Patterson et al.

(10) Patent No.: US 11,154,800 B2
(45) Date of Patent: *Oct. 26, 2021

(54) FLUID PURIFICATION DEVICE

(71) Applicant: Unger Marketing International, LLC, Bridgeport, CT (US)

(72) Inventors: Joseph K. Patterson, Monroe, CT (US); James M. Buckley, New Hartford, CT (US); Robert F. Smith, Waterbury, CT (US); Paul H. Adams, Monroe, CT (US)

(73) Assignee: UNGER MARKETING INTERNATIONAL, LLC, Bridgeport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/177,862

(22) Filed: Nov. 1, 2018

(65) Prior Publication Data

US 2019/0070535 A1 Mar. 7, 2019

Related U.S. Application Data

(63) Continuation-in-part of application No. 29/615,291, filed on Aug. 28, 2017, now Pat. No. Des. 849,886,
(Continued)

(51) Int. Cl.
*B01D 35/30* (2006.01)
*B01D 24/10* (2006.01)
(Continued)

(52) U.S. Cl.
CPC ............. *B01D 35/30* (2013.01); *B01D 24/10* (2013.01); *B01D 35/1475* (2013.01);
(Continued)

(58) Field of Classification Search
CPC ........ B01D 2201/301; B01D 2201/307; B01D 24/10; B01D 35/1475; B01D 35/30;
(Continued)

(56) References Cited

U.S. PATENT DOCUMENTS

| 429,384 A | 6/1890 | Manwaring |
| 661,339 A | 11/1900 | Grever |

(Continued)

FOREIGN PATENT DOCUMENTS

| CA | 2964732 A1 | 10/2015 |
| CH | 351907 A | 1/1961 |

(Continued)

OTHER PUBLICATIONS

Penquin Filter Pump Industries, "In-Tank & Out-Tank Filtration Systems", https://filterpump.com, Jul. 2010 (Jul. 2010)—refer to BF Bag Filtration Systems.

(Continued)

*Primary Examiner* — Terry K Cecil
(74) *Attorney, Agent, or Firm* — Cantor Colburn LLP

(57) ABSTRACT

A device and system for purifying a fluid is provided. The device includes a tank having a hollow interior and a lock feature. A cover is sealingly coupled to the tank. A release assembly is pivotally coupled to the cover and engaged with the lock feature, the release assembly having a relief valve fluidly coupled to the hollow interior and a lock member, the release assembly being rotatable between a first position and a second position, wherein the relief valve is in a closed position and the lock member is engaged with the lock feature in the first position, and wherein the relief valve is open and the lock member rotates away from and is disengaged from the lock feature in the second position.

18 Claims, 13 Drawing Sheets

Related U.S. Application Data which is a continuation of application No. 14/684,071, filed on Apr. 10, 2015, now Pat. No. 10,414,671.

(51) Int. Cl.

| C02F 1/00 | (2006.01) |
|---|---|
| B01D 35/147 | (2006.01) |
| C02F 103/44 | (2006.01) |
| C02F 1/68 | (2006.01) |

(52) U.S. Cl.
CPC ........ *C02F 1/001* (2013.01); *B01D 2201/301* (2013.01); *B01D 2201/307* (2013.01); *B01D 2201/34* (2013.01); *B01D 2201/40* (2013.01); *C02F 1/68* (2013.01); *C02F 2103/44* (2013.01); *C02F 2201/007* (2013.01)

(58) Field of Classification Search
CPC .......... B01D 2201/162; B01D 2201/34; B01D 2201/40; C02F 1/001; C02F 2103/44; C02F 1/68; C02F 2201/005; C02F 2201/006; C02F 2201/007
See application file for complete search history.

(56) References Cited

U.S. PATENT DOCUMENTS

| 1,211,369 | A | 1/1917 | Miller |
|---|---|---|---|
| 1,527,046 | A | 2/1925 | Ingram |
| 2,063,086 | A | 12/1936 | Fitz Gerald |
| 2,073,991 | A | 3/1937 | Koser |
| 2,087,157 | A | 7/1937 | Lind |
| 2,167,225 | A | 7/1939 | Van Eweyk |
| 2,278,488 | A | 4/1942 | Ralston |
| 2,295,708 | A | 9/1942 | Raymond |
| 2,365,221 | A | 12/1944 | Shafor |
| 2,367,260 | A | 1/1945 | Beddoes |
| 2,525,497 | A | 10/1950 | Monfried |
| 2,630,227 | A | 3/1953 | Rodwell |
| 2,717,614 | A | 9/1955 | Palivos |
| 2,753,302 | A | 7/1956 | Cioffi |
| 3,094,043 | A | 6/1963 | Powers et al. |
| D198,153 | S | 5/1964 | Baker |
| 3,209,915 | A | 10/1965 | Gutkowski |
| 3,266,628 | A | 8/1966 | Price |
| 3,283,903 | A | 11/1966 | Muller |
| 3,319,794 | A | 5/1967 | Gross |
| 3,327,859 | A | 6/1967 | Pall |
| 3,342,340 | A | 9/1967 | Shindell |
| 3,371,792 | A | 3/1968 | Weyand et al. |
| 3,402,126 | A | 9/1968 | Cioffi |
| 3,442,390 | A | 5/1969 | Petrucci et al. |
| 3,497,069 | A | 2/1970 | Lindenthal et al. |
| 3,517,816 | A | 6/1970 | Hoppen |
| 3,561,602 | A | 2/1971 | Molitor |
| 3,642,213 | A | 2/1972 | Parkison et al. |
| 3,746,171 | A | 7/1973 | Thomsen |
| 3,807,298 | A | 4/1974 | Luke et al. |
| 3,960,092 | A | 6/1976 | Newman, Jr. |
| 4,005,010 | A | 1/1977 | Lunt |
| 4,048,030 | A | 9/1977 | Miller |
| 4,048,064 | A | 9/1977 | Clark, III |
| 4,049,548 | A | 9/1977 | Dickerson |
| 4,102,473 | A | 7/1978 | Draxler |
| 4,272,263 | A | 6/1981 | Hancock |
| 4,368,123 | A | 1/1983 | Stanley |
| 4,418,924 | A | 12/1983 | Mack |
| 4,654,140 | A | 3/1987 | Chen |
| 4,659,460 | A | 4/1987 | Muller et al. |
| 4,728,422 | A | 3/1988 | Bailey |
| 4,793,922 | A | 12/1988 | Morton |
| 4,795,173 | A | 1/1989 | Osborne |
| 4,877,526 | A | 10/1989 | Johnson et al. |
| 4,882,050 | A | 11/1989 | Kopf |
| 4,885,089 | A | 12/1989 | Hankammer |
| 4,932,915 | A | 6/1990 | Boris et al. |
| 4,989,636 | A | 2/1991 | Hunter et al. |
| 5,006,238 | A | 4/1991 | Tominaga |
| D320,273 | S | 9/1991 | Heiden |
| 5,064,534 | A | 11/1991 | Busch |
| 5,087,357 | A | 2/1992 | Villa |
| 5,100,551 | A | 3/1992 | Pall et al. |
| 5,112,503 | A | 5/1992 | Raifman |
| 5,114,572 | A | 5/1992 | Hunter et al. |
| 5,137,632 | A | 8/1992 | Morgan, Jr. |
| 5,154,823 | A | 10/1992 | Ma et al. |
| 5,236,595 | A | 8/1993 | Wang et al. |
| 5,254,242 | A | 10/1993 | Van Der Meer |
| 5,288,412 | A | 2/1994 | Voorhees et al. |
| 5,318,703 | A | 6/1994 | Heiligman |
| 5,378,370 | A | 1/1995 | Brane et al. |
| 5,510,027 | A | 4/1996 | Tejeda |
| D372,760 | S | 8/1996 | Brancazio |
| D374,064 | S | 9/1996 | Brancazio |
| 5,558,244 | A | 9/1996 | Akaike et al. |
| 5,566,611 | A | 10/1996 | Scheucher et al. |
| 5,595,652 | A | 1/1997 | Rainer |
| 5,605,624 | A | 2/1997 | Wright |
| 5,605,632 | A | 2/1997 | Jansen |
| 5,624,559 | A | 4/1997 | Levin et al. |
| 5,637,214 | A | 6/1997 | Kahana |
| 5,660,863 | A | 8/1997 | Nakano et al. |
| 5,853,572 | A | 12/1998 | Kuennen et al. |
| 5,876,600 | A | 3/1999 | Matsubara et al. |
| 5,985,139 | A | 11/1999 | Zoeller |
| 5,993,656 | A | 11/1999 | Cordani |
| 6,068,761 | A | 5/2000 | Yuen |
| 6,009,728 | A | 8/2000 | Bairischer |
| 6,099,728 | A | 8/2000 | Bairischer |
| 6,120,686 | A | 9/2000 | Bilz |
| 6,132,612 | A | 10/2000 | Bourgeois |
| 6,136,183 | A | 10/2000 | Suzuki et al. |
| 6,197,193 | B1 | 3/2001 | Archer |
| 6,274,055 | B1 | 8/2001 | Zuk, Jr. |
| 6,343,697 | B1 | 2/2002 | Hausdorf et al. |
| 6,391,097 | B1 | 5/2002 | Rosenberg |
| 6,485,639 | B1 | 11/2002 | Gannon et al. |
| 6,500,335 | B2 | 12/2002 | Janik et al. |
| 6,610,275 | B1 | 8/2003 | Owades et al. |
| 6,622,871 | B2 | 9/2003 | Gabele et al. |
| D481,442 | S | 10/2003 | Liu |
| 6,649,056 | B2 | 11/2003 | Fritze |
| 6,685,843 | B2 | 2/2004 | Leaverton |
| 6,716,348 | B1 | 4/2004 | Morgan |
| 6,764,595 | B1 | 7/2004 | Halemba et al. |
| 6,773,588 | B2 | 8/2004 | Beeman et al. |
| D496,984 | S | 10/2004 | Costa |
| D506,551 | S | 6/2005 | Booth et al. |
| 6,966,444 | B2 | 11/2005 | Morgan |
| 7,014,690 | B2 | 3/2006 | Mitsch et al. |
| 7,147,774 | B2 | 12/2006 | Jones, III |
| 7,156,994 | B1 | 1/2007 | Archer |
| 7,186,338 | B2 | 3/2007 | Boisvert |
| 7,243,728 | B2 | 7/2007 | Stoesz et al. |
| 7,303,605 | B2 | 12/2007 | Zia et al. |
| D562,431 | S | 2/2008 | Brune |
| 7,357,337 | B2 | 4/2008 | Ferrari |
| 7,378,019 | B1 | 5/2008 | Currier et al. |
| 7,459,078 | B2 | 12/2008 | Klein |
| 7,566,399 | B2 | 7/2009 | Kuo et al. |
| D606,420 | S | 12/2009 | Shoji |
| 7,625,199 | B2 | 12/2009 | Jahn et al. |
| 7,748,755 | B2 | 7/2010 | Camp et al. |
| 7,850,859 | B2 | 12/2010 | Tanner et al. |
| 7,963,400 | B2 | 6/2011 | Stolarik et al. |
| 8,110,103 | B2 | 2/2012 | Mormino et al. |
| 8,182,212 | B2 | 5/2012 | Parcell |
| D661,339 | S | 6/2012 | Thixton et al. |
| 8,323,493 | B2 | 12/2012 | Quintel et al. |
| 8,393,262 | B1 | 3/2013 | Molayem |
| 8,464,743 | B2 | 6/2013 | King et al. |
| D692,524 | S | 10/2013 | Ziser |
| 8,815,086 | B2 | 8/2014 | Morgan |
| D740,915 | S | 10/2015 | Harrington |

(56) References Cited

U.S. PATENT DOCUMENTS

| | | |
|---|---|---|
| D742,997 S | 11/2015 | Sgroi |
| D779,629 S | 2/2017 | Kemper |
| D797,888 S | 9/2017 | Schurmeyer |
| D798,996 S | 10/2017 | Sgroi |
| D828,488 S | 9/2018 | Sgroi |
| 10,088,398 B2* | 10/2018 | Clark ............... G01N 1/4005 |
| 10,414,671 B2* | 9/2019 | Hirsch ............... B01D 35/1475 |
| D911,486 S | 2/2021 | Sgroi, Jr. |
| 2004/0084361 A1 | 5/2004 | Janik et al. |
| 2004/0140251 A1 | 7/2004 | Hsiao |
| 2004/0149666 A1 | 8/2004 | Leaverton |
| 2004/0251191 A1 | 12/2004 | Darmawan |
| 2005/0199536 A1 | 9/2005 | Koslow |
| 2006/0086656 A1 | 4/2006 | Morgan |
| 2007/0000829 A1 | 1/2007 | Boisvert |
| 2007/0235381 A1 | 10/2007 | Tsai |
| 2008/0000820 A1 | 1/2008 | Mitchell |
| 2008/0011669 A1 | 1/2008 | Morgan |
| 2008/0296210 A1 | 12/2008 | Bittner |
| 2009/0008318 A1 | 1/2009 | Anes et al. |
| 2009/0045583 A1 | 2/2009 | Ropponen |
| 2009/0146421 A1 | 6/2009 | Engdahl |
| 2009/0314703 A1 | 12/2009 | Beach et al. |
| 2010/0012590 A1 | 1/2010 | Slark |
| 2010/0084030 A1 | 4/2010 | Mackulin et al. |
| 2010/0126946 A1 | 5/2010 | Morgan |
| 2010/0314301 A1 | 12/2010 | Sloan et al. |
| 2011/0062065 A1 | 3/2011 | McCague |
| 2011/0062066 A1 | 3/2011 | McCague |
| 2011/0089180 A1 | 4/2011 | Kolbasi |
| 2011/0303618 A1 | 12/2011 | Cueman et al. |
| 2012/0085687 A1 | 4/2012 | Simonette |
| 2012/0261325 A1 | 10/2012 | Brown et al. |
| 2012/0261329 A1 | 10/2012 | Quintel |
| 2012/0261359 A1 | 10/2012 | Quintel et al. |
| 2013/0020246 A1 | 1/2013 | Hoots et al. |
| 2013/0025447 A1 | 1/2013 | Crowder |
| 2013/0056406 A1 | 5/2013 | Jacobs et al. |
| 2013/0277298 A1 | 10/2013 | Sanocki et al. |
| 2014/0027361 A1 | 1/2014 | Pennington |
| 2015/0107205 A1* | 4/2015 | Hartog ............... B01D 35/30 55/502 |
| 2015/0353383 A1 | 12/2015 | Hirsch et al. |
| 2017/0197854 A1 | 7/2017 | Chandler, Jr. et al. |
| 2018/0194646 A1 | 7/2018 | Camp |
| 2019/0193006 A1* | 6/2019 | Huda ............... C02F 1/001 |
| 2020/0001214 A1 | 1/2020 | Adams |
| 2020/0010338 A1 | 1/2020 | Hirsch et al. |
| 2021/0024380 A1 | 1/2021 | Camp et al. |

FOREIGN PATENT DOCUMENTS

| | | |
|---|---|---|
| CN | 105709492 A | 6/2016 |
| DE | 860195 | 12/1952 |
| DE | 2020929 A1 | 1/1972 |
| DE | 2364504 A1 | 8/1974 |
| DE | 2608408 | 11/1976 |
| DE | 2531850 | 1/1977 |
| DE | 3207511 A1 | 9/1983 |
| DE | 3624414 | 1/1988 |
| DE | 4136852 A1 | 5/1993 |
| DE | 4325114 C1 | 11/1994 |
| DE | M97016860001 | 8/1997 |
| DE | 69411911 T2 | 2/1999 |
| DE | 20022322 U1 | 7/2001 |
| DE | 10305632 A1 | 11/2003 |
| DE | 202006002737 U1 | 4/2006 |
| EP | 1221429 A1 | 11/1999 |
| EP | 0003898380031 | 8/2005 |
| EP | 0003898380032 | 10/2005 |
| EP | 1626936 A1 | 2/2006 |
| EP | 1728767 A1 | 12/2006 |
| EP | 0676010 B1 | 7/2010 |
| EP | 2969106 A1 | 1/2016 |
| EP | 3056276 A2 | 8/2016 |
| EP | 3070058 A1 | 9/2016 |
| EP | 3214046 A1 | 9/2017 |
| EP | 3372558 A1 | 9/2018 |
| FR | 2636940 A1 | 3/1990 |
| GB | 525643 A | 9/1940 |
| GB | 1296051 | 3/1969 |
| GB | 1404267 | 8/1975 |
| GB | 1441269 A | 6/1976 |
| GB | 1543590 | 4/1979 |
| GB | 2206292 A | 1/1989 |
| GB | 2222536 A | 3/1990 |
| JP | H07163820 A | 6/1995 |
| JP | 11090427 | 4/1999 |
| JP | 2005138064 A | 6/2005 |
| NL | 8204637 | 6/1984 |
| WO | 03064290 | 8/2003 |
| WO | 2004110938 A2 | 12/2004 |
| WO | 2005115924 A2 | 12/2005 |
| WO | 2010010574 | 1/2010 |
| WO | 2010010574 A1 | 1/2010 |
| WO | 2010081075 | 1/2010 |
| WO | 2013103765 A1 | 7/2013 |
| WO | 2015157680 A1 | 10/2015 |
| WO | 2016068746 A1 | 5/2016 |
| WO | 2018067437 A1 | 4/2018 |

OTHER PUBLICATIONS

Lustiges Taschenbuch No. 210 (front page, pp. 2, 3, 218, 219, 238, 239, 240, 241, published 1995).
"Componenti Per Addolcitori/Water Softners Components," ITA/NIG-CAT-801, Dated Apr. 2009, 6 Pages.
Application for Invalidation dated Sep. 28, 2016 in European Community Registration EU 002555425-0002.
Walt Disney's Donald Duck No. 378 (Front page, p. 1; published 1987).
Walt Disney's Donald Duck No. 379 (Front page, p. 1 and p. 73; published 1987).
Extended European Search Report; International Application No. 19181177.7; International Filing Date: Jun. 19, 2019; dated Dec. 9, 2019; 9 pages.
Extended European Search Report; International Application No. 19205920.2, International Filing Date: Oct. 29, 2019; dated Dec. 9, 2019; 6 pages.
Japanese Office Action dated Jan. 24, 2020; 2 pgs.
Extended European Search Report; International Application No. 19190926.6-1101; International Filing Date: Aug. 9, 2019; dated Feb. 3, 2020; 9 pages.
U.S. Non-Final Office Action; U.S. Appl. No. 15/914,049; Application Filing Date: Mar. 7, 2018; dated Mar. 18, 2020; 50 pages.
U.S. Non-Final Office Action; U.S. Appl. No. 29/662,860; Application Filing Date: Sep. 10, 2018; dated Feb. 21, 2020; 44 pages.
Susan Selke: "Packaging: Polymers in Flexible Packaging", Encyclopedia of Materials: Science and Technology (Second Edition), Dec. 31, 2001 (Dec. 31, 2001), pp. 6652-6656, XP055742846, Retrieved from the Internet: URL:https://www.sciencedirect.com/sdfe/pdf/download/eid/3-s2.0-B0080431526011761/first-page-pdf [retrieved on Oct. 22, 2020].
Communication pursuant to Article 94(3) EPC; International Application No. 1918177.7-1101; International Filing Date: Jun. 19, 2019; dated Apr. 19, 2021; 5 pages.
Communication pursuant to Article 94(3) EPC; International Application No. 19205920.2-1101; International Filing Date: Oct. 29, 2019; dated Apr. 21, 2021; 4 pages.

\* cited by examiner

FLUID PURIFICATION DEVICE

CROSS-REFERENCE TO RELATED APPLICATIONS

The present application is a continuation-in-part application of U.S. application Ser. No. 29/615,291 entitled "Water Purification Device" filed on Aug. 28, 2017, and is also a continuation in part of U.S. application Ser. No. 14/684,071 filed on Apr. 10, 2015, the contents of both of which are incorporated by reference herein.

BACKGROUND OF THE DISCLOSURE

The subject matter disclosed herein relates to a fluid purification device, and in particular to a fluid purification device having a replaceable media module.

It is desirable to use purified water (referred to herein as "pure water") in various cleaning applications. One common cleaning application for pure water is the cleaning of windows, cars, buildings, solar panels, and other surfaces. For example, the use of pure water in the form of deionized (DI) water, also known as demineralized (DM) water, has been found to be effective when cleaning smooth or reflective surfaces such as automobiles. The pure water can reduce the formation water marks and spots, which can be formed by impurities in untreated water that remain on the surface when the water dries.

Many pure water systems use one or more types of purification media either alone or in combination with other devices/processes such as, but not limited to, particle filtration, distilling (i.e., distilled water), reverse osmosis, desalination, carbon filtration, microfiltration, ultrafiltration, ultraviolet oxidation, electrodialysis, nanofiltration, others, and any combinations thereof.

Some pure water systems improve the ease of replacing depleted or spent purification media by providing media purification devices that contain or house the purification media. Still further pure water systems condition the water by adding to or removing one or more components from the input water.

Accordingly, while existing water conditioning systems are suitable for their intended purposes the need for improvement remains, particularly in providing a fluid purification system having the features described herein.

BRIEF DESCRIPTION OF THE DISCLOSURE

According to one aspect of the disclosure a fluid purification device is provided. The device includes a tank having a hollow interior and a lock feature. A cover is sealingly coupled to the tank. A release assembly is pivotally coupled to the cover and engaged with the lock feature, the release assembly having a relief valve fluidly coupled to the hollow interior and a lock member, the release assembly being rotatable between a first position and a second position, wherein the relief valve is in a closed position and the lock member is engaged with the lock feature in the first position, and wherein the relief valve is open and the lock member rotates away from and is disengaged from the lock feature in the second position.

Additionally or alternatively, in this or other embodiments the relief valve opens and the lock member disengages simultaneously when the release assembly rotates from the first position to the second position. Additionally or alternatively, in this or other embodiments the lock feature is a rib on an exterior surface of the tank and the cover includes a slot on an inner surface. Additionally or alternatively, in this or other embodiments the release assembly further includes a lever coupled between the lock member and the relief valve, the lever having a portion operably coupled to the relief valve.

Additionally or alternatively, in this or other embodiments the lock member includes an arm having a first projection extending therefrom, the first projection having a slot sized to receive the lock feature. Additionally or alternatively, in this or other embodiments the lock feature is a second projection extending from the side of the tank. Additionally or alternatively, in this or other embodiments the first projection includes at least one angled surface.

Additionally or alternatively, in this or other embodiments the relief valve includes a biasing member arranged to bias the release assembly into the first position. Additionally or alternatively, in this or other embodiments the relief valve includes a cap coupled to a valve body, the biasing member being disposed between the cap and the cover, the valve body extending through the cover and having a head that selectively seals with the cover.

According to another aspect of the disclosure a fluid purification system is provided. The system includes a tank having a first port and a hollow interior. A purification device is disposed at least partially within the hollow interior. A cover is sealingly coupled to the tank, the cover assembly having a second port fluidly coupled to the purification device. A release assembly is coupled to the cover, the release assembly having a relief valve fluidly coupled to the hollow interior and a lock member, the release assembly being rotatable between a first position and a second position, wherein the relief valve is in a closed position and the lock member is coupled to the tank in the first position, and wherein the relief valve is open and the lock member rotates away from and is disengaged from the tank in the second position Additionally or alternatively, in this or other embodiments the relief valve opens and the lock member disengages simultaneously when the release assembly rotates from the first position to the second position. Additionally or alternatively, in this or other embodiments the tank includes a lock feature on an exterior surface of the tank. Additionally or alternatively, in this or other embodiments the release assembly further includes a lever coupled between the lock member and the relief valve, the lever having a portion operably coupled to the relief valve. Additionally or alternatively, in this or other embodiments the lock member includes an arm having a first projection extending therefrom, the first projection having a slot sized to receive the lock feature.

Additionally or alternatively, in this or other embodiments the lock feature is a second projection extending from the side of the tank. Additionally or alternatively, in this or other embodiments the first projection includes at least one angled surface. Additionally or alternatively, in this or other embodiments the relief valve includes a biasing member arranged to bias the release assembly into the first position. Additionally or alternatively, in this or other embodiments the relief valve includes a cap coupled to a valve body, the biasing member being disposed between the cap and the cover, the valve body extending through the cover and having a head that selectively seals with the cover.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Embodiments of the present disclosure are directed to a fluid purification system such as that used to condition or generate pure water. Embodiments provide technical effect in a release and lock assembly that simultaneously release pressure from an interior of the system and unlock a cover assembly.

Figure 1:
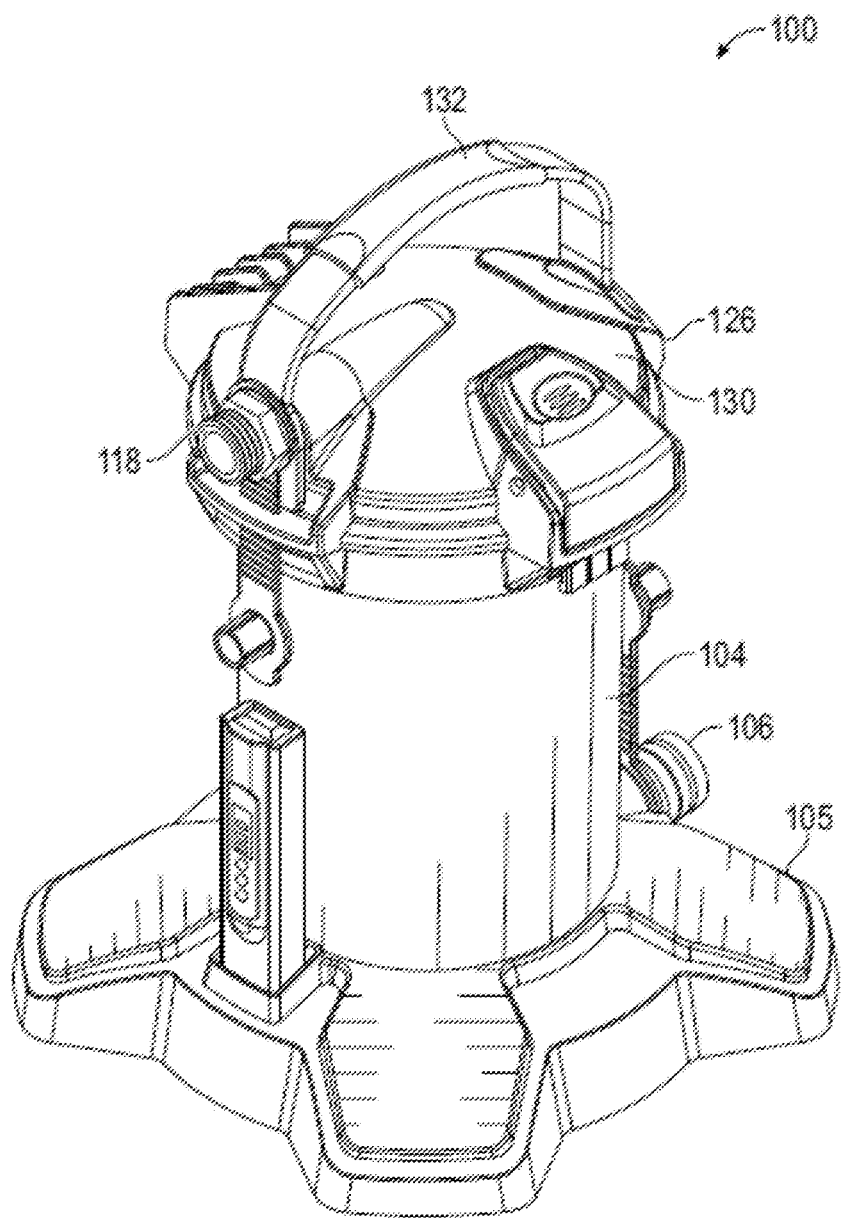
FIG. 1 is a perspective view of a fluid purification device according to an embodiment.
Figure 2:
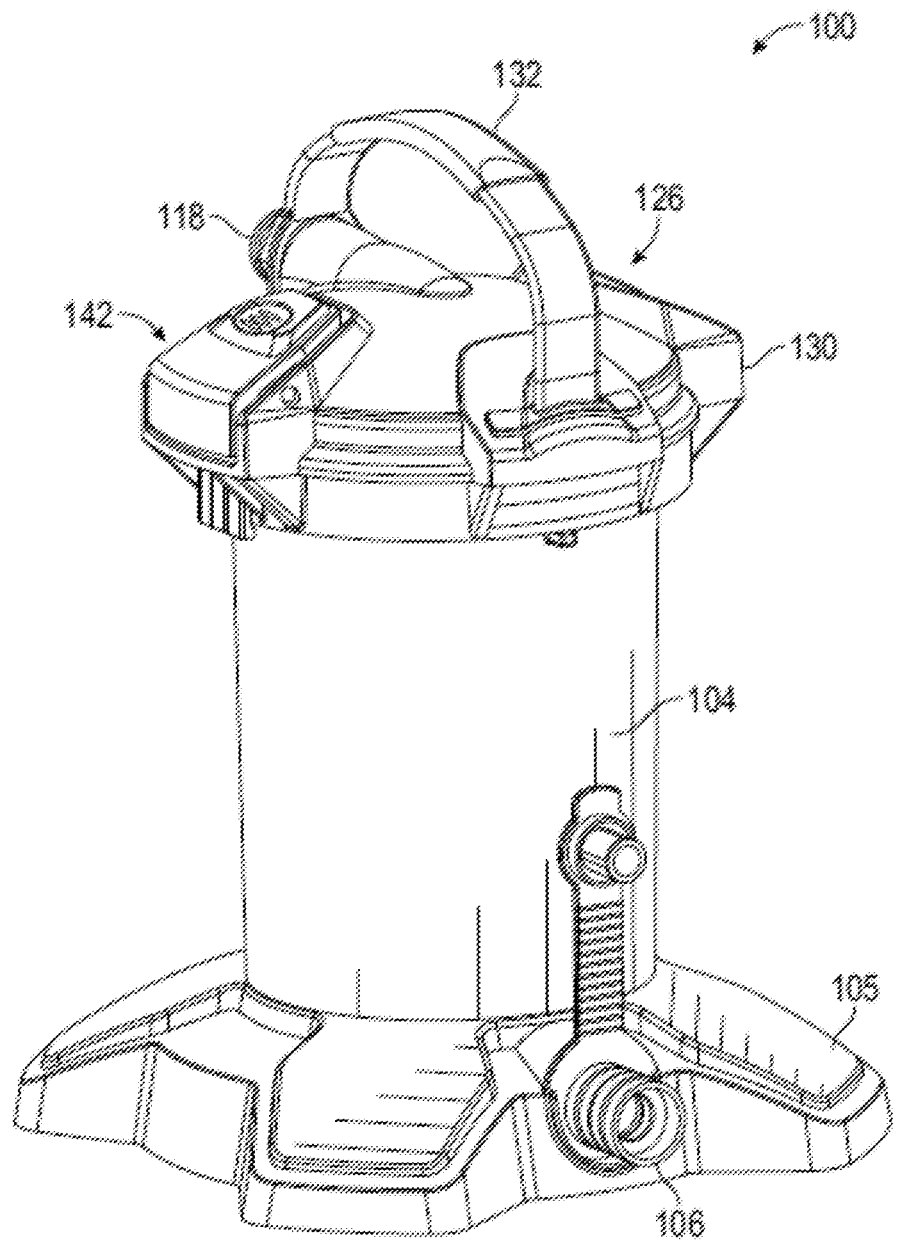
FIG. 2 is another perspective view of the fluid purification device of FIG. 1.
Figure 3:
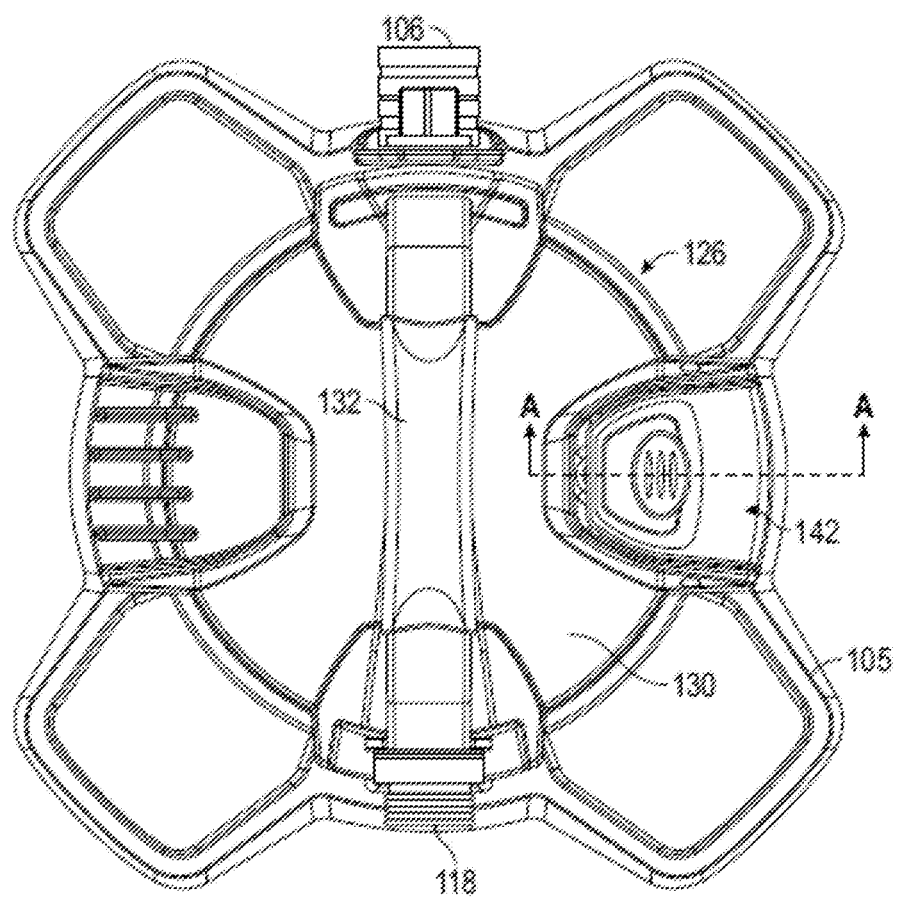
FIG. 3 is a top view of the fluid purification device of FIG. 1.
Figure 4:
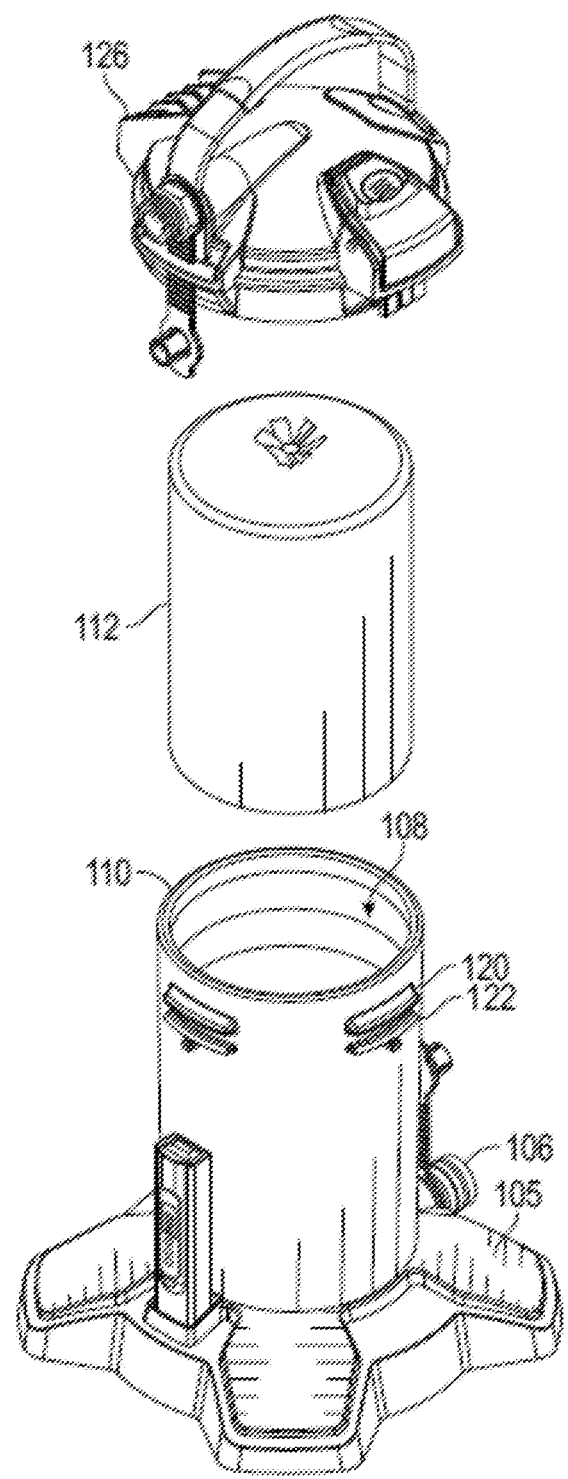
FIG. 4 is a perspective unassembled view of the fluid purification device of FIG. 1.

Referring now to FIG. 1, an embodiment is shown of a fluid purification system 100. It should be appreciated that while the illustrated embodiment may refer to the fluid purification system 100 as generating pure water for use in cleaning applications, this is for exemplary purposes and the claims should not be so limited in other embodiments, the fluid purification system 100 may be used in other applications, such as for conditioning water for using in washing vehicles. The system 100 includes a base 105 that holds and supports a tank 104. The tank 104 includes an inlet port 106 and a hollow interior 108 (FIG. 4). The tank 104 includes an open end 110 (FIG. 4).

The hollow interior 108 includes an inner surface having a diameter sized to receive a replaceable media module 112. The media module includes a purification media 200 that is under compression when the module is inserted into the hollow interior 108. It should be appreciated that while embodiments herein describe the hollow interior 108 as being circular, this is for exemplary purposes and the claims should not be so limited. In one or more embodiments described herein, the interior 108 may be any suitable shape, such as but not limited to square, rectangular, oval, or a polygon for example.

It should be appreciated that while embodiments herein may describe the port 106 as being an "inlet" and the port 118 as being the "outlet," this is for example purposes and the claims should not be so limited. In other embodiments, the flow of fluid may be reversed, with the port 118 being the "inlet" and the port 106 being the "outlet."

In an embodiment, the module 112 includes an initial volume of purification media. As the system 100 is operated, such as to generate pure water for example, the water will pass through the media to become purified. As used herein, the terms "pure", "purified", and "purification" includes the removal of one or more components and/or the addition of one or more components from water or any other fluid. The components removed or added can include soluble and/or insoluble materials such as, but not limited to minerals, salts, suspended particles, bacteria, and others, where the soluble components are often referred to as total dissolved solids or TDS.

During operation, the purification of the fluid will cause the purification media to gradually deplete. As the purification media depletes, it also reduces in volume. As used herein, the term "depleted volume" means an operating condition where the output water (e.g. at the outlet port 118) has a TDS level that is substantially the same as the input water. It has been found that the depleted volume is about 10-20% less than the initial volume. Therefore, in the illustrated embodiment, the initial volume of purification media is selected to allow a 20% reduction in volume and still be under compression when at the depleted volume.

In an embodiment, the purification media is contained by a member made from a thin porous, flexible, and/or elastic material. In an embodiment, at least one of the material is both porous and elastic. In other embodiments, at least one of the material is both porous and flexible. In some such embodiments, member may be formed from a material that has 5%-25% elastane and 75%-95% Nylon, preferably a material formed from between 10%-20 elastane and between 80%-90% Nylon, or with 15% elastane and 85% Nylon being desired, and any subranges therebetween. In one embodiment, the flexible bag may be 100% nylon or polyamide (PA).

In the illustrated embodiment, the replaceable media module 112 is tubular in shape after inserted into the tank 104. It should be appreciated that due to the elastic properties of the first member 202, the module 112 may have a bulbous shape when placed on a surface outside of the tank 104. In other embodiments where the module 112 has a member that is flexible, but has relative low elasticity, the module 112 may have relatively straight sides (e.g. non-bulbous) when placed on a surface outside of the tank 104. In some embodiments where module 112 is configured for use with the tank 104, which has an internal diameter of 130 mm, the module 112 may have an outer diameter of between 100 mm and 300 mm, or between about 140 mm to 250 mm, and any subranges therebetween. In this manner, the module 112 has outer diameter that is within ±20%, or within −10% to 0%, with about −4% of the inner diameter of the hollow interior 108 being desired, and any subranges therebetween.

The tank includes a plurality of radial pins or ribs 120, 122 (FIG. 5), with the first plurality of ribs 120 being closer to the open end 110. The second plurality of ribs 122 includes a projection 124 that extends radially outward from each rib 122. In the illustrated embodiment, the projection 124 is centrally located on each rib 122. As will be discussed in more detail herein, the ribs 120, 122 are sized and positioned to engage slots within a cover assembly 126. Further, it should be appreciated that while the illustrated embodiment shows the ribs 120, 122 as being positioned on the outer diameter of the tank 104, in other embodiments the ribs 120, 122 may be positioned on the inside diameter of the tank 104. Further in other embodiments, the tank 104 includes slots and the cover assembly 126 includes corresponding ribs.

Figure 9:
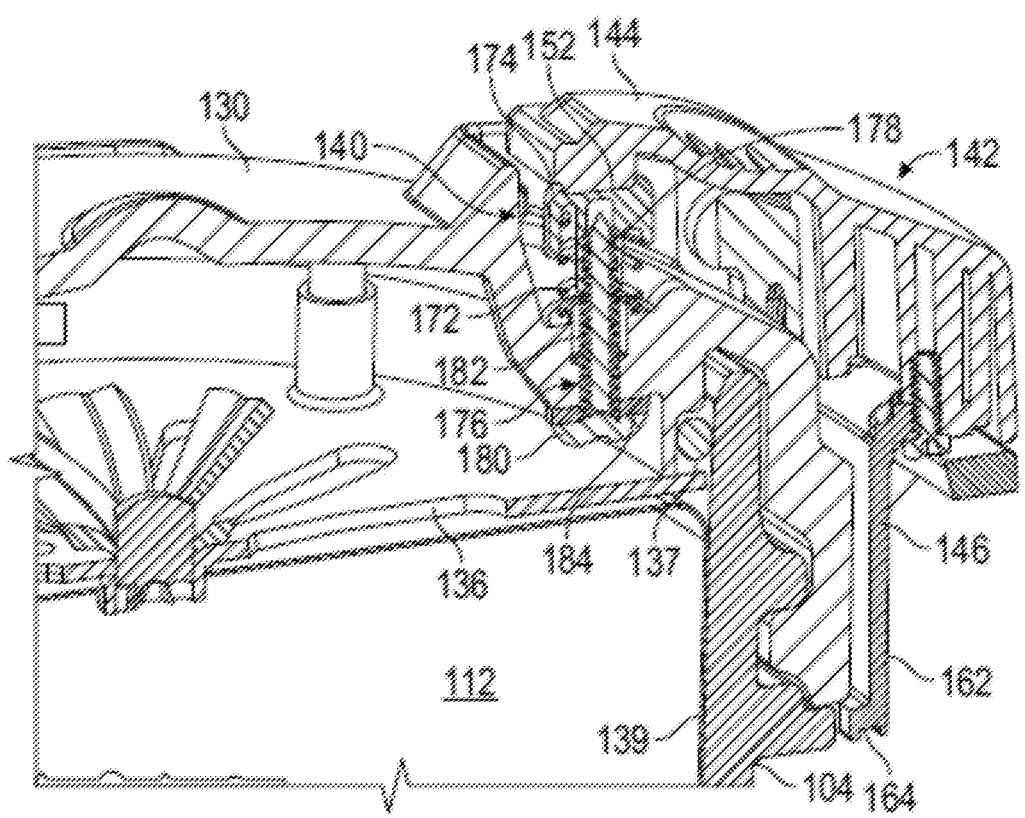
FIG. 9 is a partial perspective sectional view taken along the line A-A of FIG. 3.

Referring now to FIGS. 1-6, the cover assembly 126 is shown. The cover assembly 126 is sized to cover and seal against the tank 104 when the ribs 120, 122 engage the slots 128 (FIG. 6) with an o-ring 137 (FIG. 9). The cover assembly 126 includes a body 130 with a handle 132 coupled thereto. The body 130 includes a hollow interior portion 134 that is in fluidly communication with the hollow interior 108 of the tank 104. In an embodiment, a diffuser element 136 may be coupled to the body 130. A port 118 is in fluid communication with the hollow interior 108. The port 118 may be an outlet port that transfers conditioned water from the system 100 to the end use application.

In the illustrated embodiment, the cover assembly 126 includes the slots 128 formed on the inside diameter of the hollow interior portion 134. When the cover assembly 126 is placed on the tank 104 and rotated with respect to each other about the longitudinal axis of the system 100, the ribs 120 are received in the slots 128 so as to form a fluid seal between the tank 104 and the cover assembly 126.

Referring now to FIGS. 7-11, the cover assembly 126 further includes a pressure relief valve 140 and a release assembly 142. The release assembly 142 includes a lever 144 and a locking member 146. In the illustrated embodiment, the lever 144 and locking member 146 are two separate components that are fixedly coupled to each other. It should be appreciated that in other embodiments, the lever 144 and locking member 146 may be fabricated as a single component. The release assembly 142 is pivotally coupled to the body 130 about an axis 148.

Figure 5:
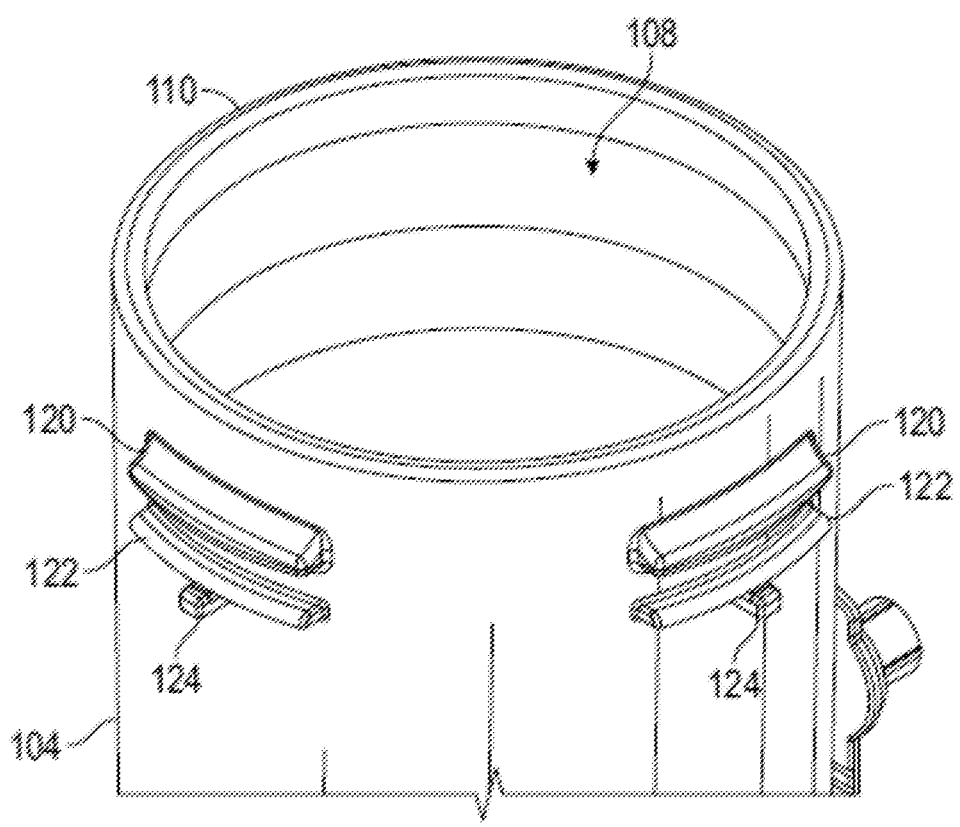
FIG. 5 is a partial perspective view of a tank portion of the fluid purification device of FIG. 1.
Figure 6:
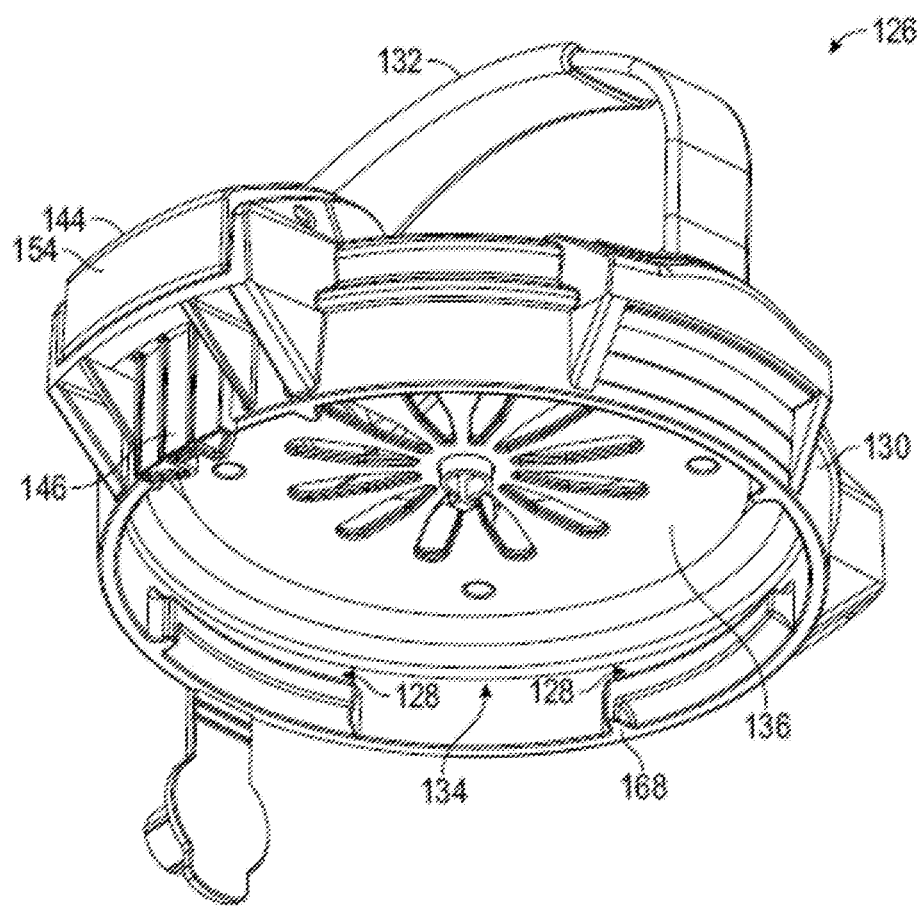
FIG. 6 is a bottom perspective view of a cover assembly of the fluid purification device of FIG. 1.
Figure 7:
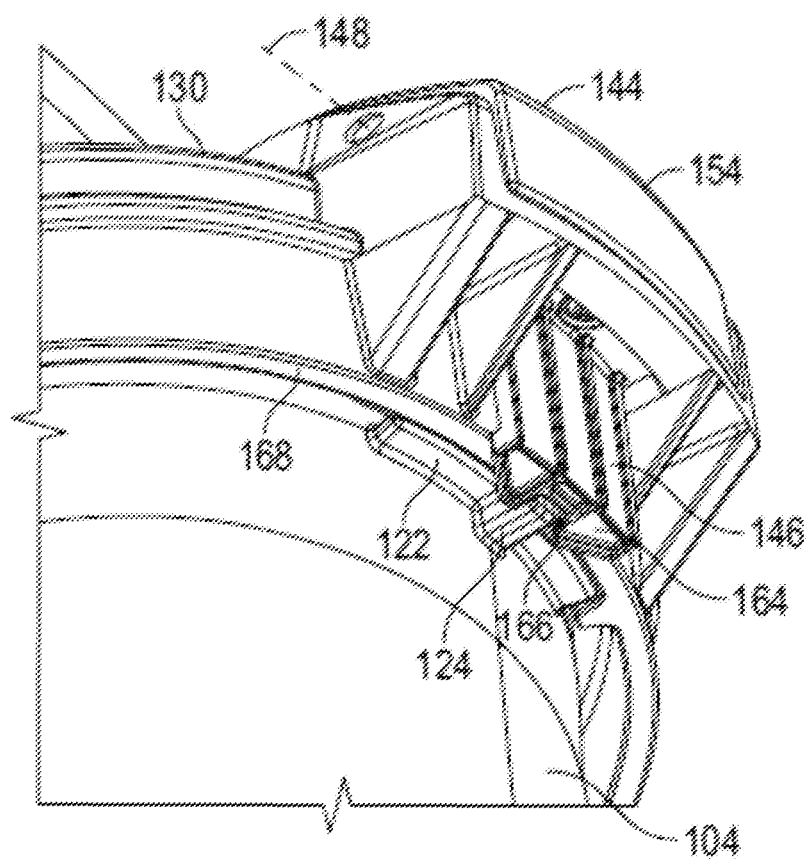
FIG. 7 is a partial perspective view of a release and lock assembly of the fluid purification device of FIG. 1.
Figure 8:
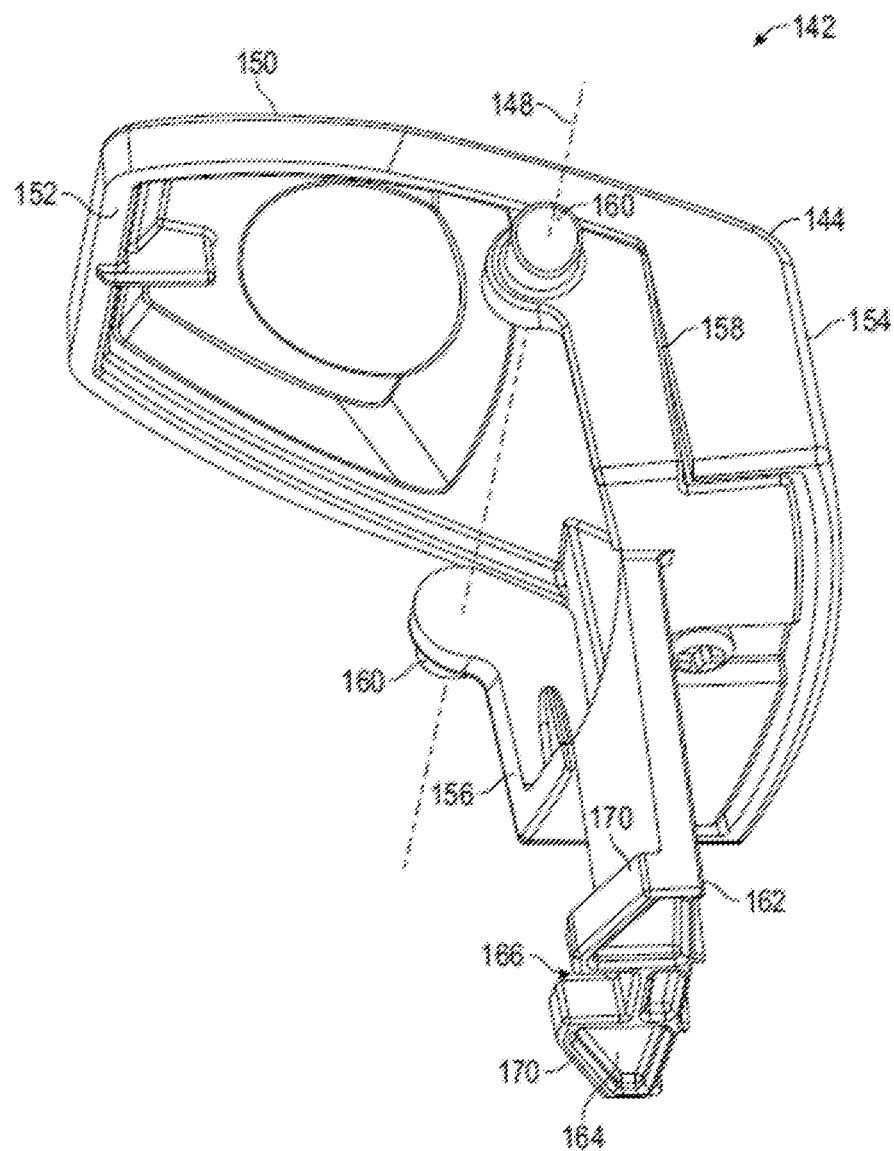
FIG. 8 is a perspective view of the release and lock assembly of FIG. 7.

The lever 144 includes a portion 150 that extends over the top of the body 130. As will be discussed in more detail herein, an end 152 of the portion 150 engages and actuates the relief valve 140. The lever 144 further includes a second portion 154 that extends along the side of the body 130. In the illustrated embodiment, the lock member 146 couples to the second portion 154. In an embodiment, the lock member 146 includes a first arm 156 and a second arm 158 (FIG. 8). The arms 156, 158 each include a trunnion 160. The trunnions 160 engage recesses in the body 130 to define the axis 148. Extending along and extending past the side of the body 130 is a locking arm 162. The locking arm 162 includes a projection 164 on a distal end. In an embodiment, the projection 164 extends generally perpendicular to the locking arm 162 and includes a slot 166 that is sized to receive the projection 124 (FIG. 5). In the illustrated embodiment, the locking arm 162 is sized to extend past the bottom edge 168 (FIG. 7) of the body 130.

When the cover assembly 126 is placed on the tank 104 and rotated to engage the rib 120 into the slot 128, the angled surface 170 will contact the projection 122 causing the release assembly 142 to rotate about the axis 148 such that the projection 164 slides over the end of the projection 124 until the slot 166 aligns with the projection 124. When the slot 166 aligns with the projection 124, the release assembly 142 will rotate back under the influence of biasing member 172 (FIG. 9) causing the projection 124 to enter and engage the slot 166. It should be appreciated that the engagement of the projection 124 and the slot 166 prevents further rotation of the cover assembly 126. Since the ribs 120, 122 are engaged with the slot 128, the cover assembly 126 is coupled in sealing relationship with the tank 104 due to the mechanical coupling of the ribs 120, 122 with the slot 128 and the engagement of the o-ring 137 with the side wall 139 (FIG. 9) of tank 104 forms a pressure seal.

Figure 10:
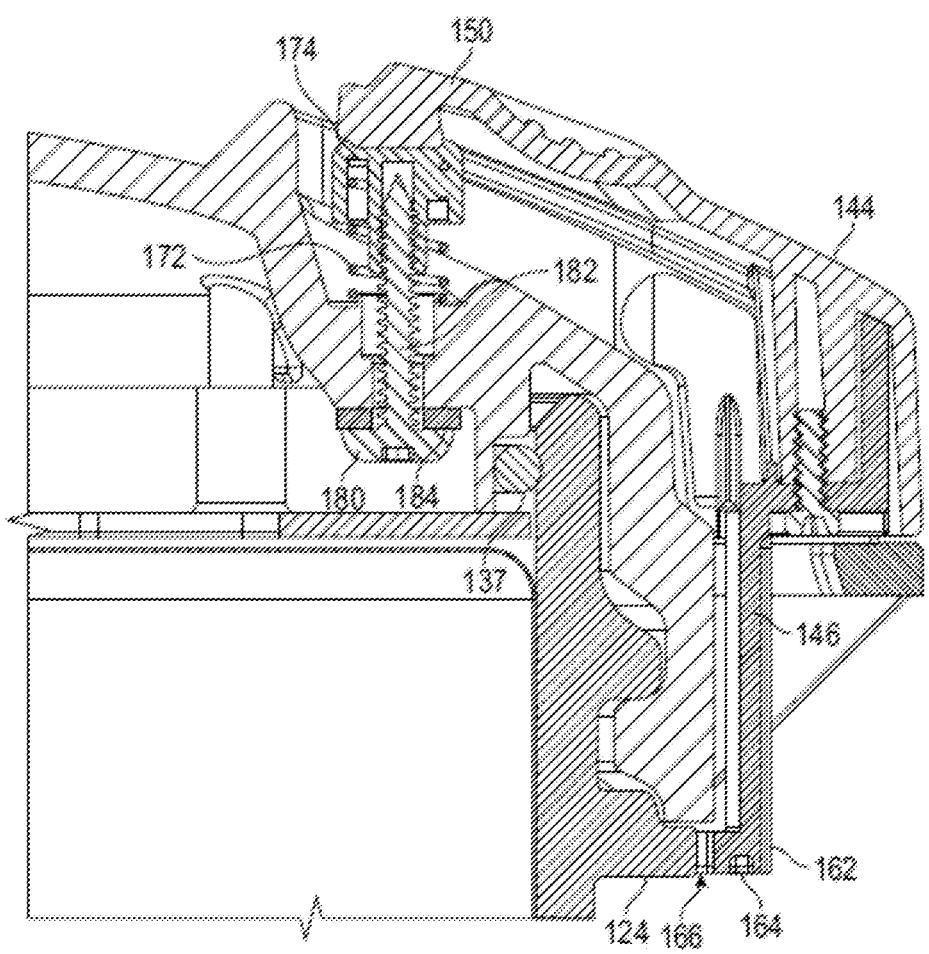
FIG. 10 is a partial side sectional view taken along the line A-A of FIG. 3 with the release and lock assembly in the closed or locked position.

The relief valve 140 includes a cap 174 that is disposed between the biasing member 172 and the end 152. Coupled to the cap 174 is a valve body 176 having a stem 178 and a head 180. In the illustrated embodiment, the stem 178 includes a thread that couples to an opening in the cap 174. In other embodiments, the stem 178 is coupled to the cap 174 via other fastening means, such as but not limited to a press fit or an adhesive for example. The stem 178 extends through an opening 182 in the body 130 to secure the relief valve to the cover assembly. In an embodiment, a seal member 184 is disposed between the head 180 and a surface 186 (FIG. 11) of the body 130. In one embodiment, the seal member 184 is coupled to the surface 186. In the illustrated embodiment, the seal member 184 is coupled to the head 180. The seal member 184 provides a seal between the head 184 and the body 130 when the relief valve 140 is in the closed position (FIG. 9, FIG. 10).

In operation, the operator couples the cover assembly 126 to the tank 104 as described above. A fluid source is coupled to one of the ports 106, 118 and an outlet conduit is coupled to the other of the ports 106, 118. The system 100 then operates by receiving fluid (e.g. water) from the input port, conditions the fluid by passing it through the purification media in module 112 and then providing the conditioned fluid to the outlet port. It should be appreciated that the operation of the system 100 pressurizes the interior volume of the system 100. This internal pressure increases the engagement force of the rib 120 on the slot 128. As a result, when the operator has finished using the system 100, the cover assembly 126 will be difficult or impossible to remove due to the internal pressure.

Figure 11:
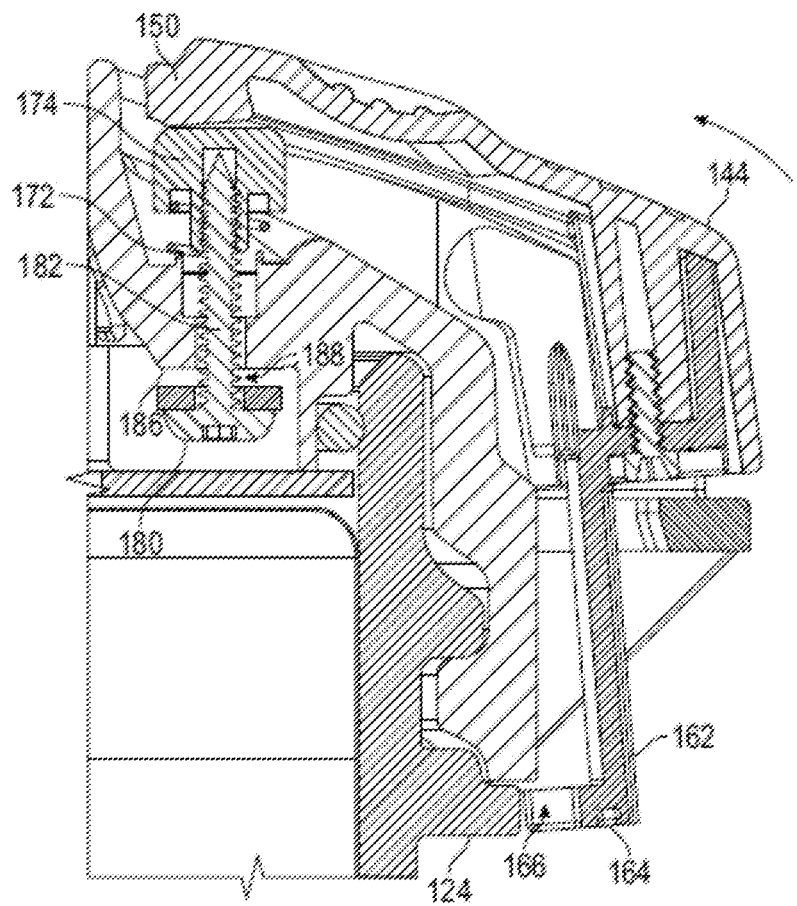
FIG. 11 is a partial side sectional view taken along the line A-A of FIG. 3 with the release and lock assembly in the open or unlocked position.
Figure 12A:
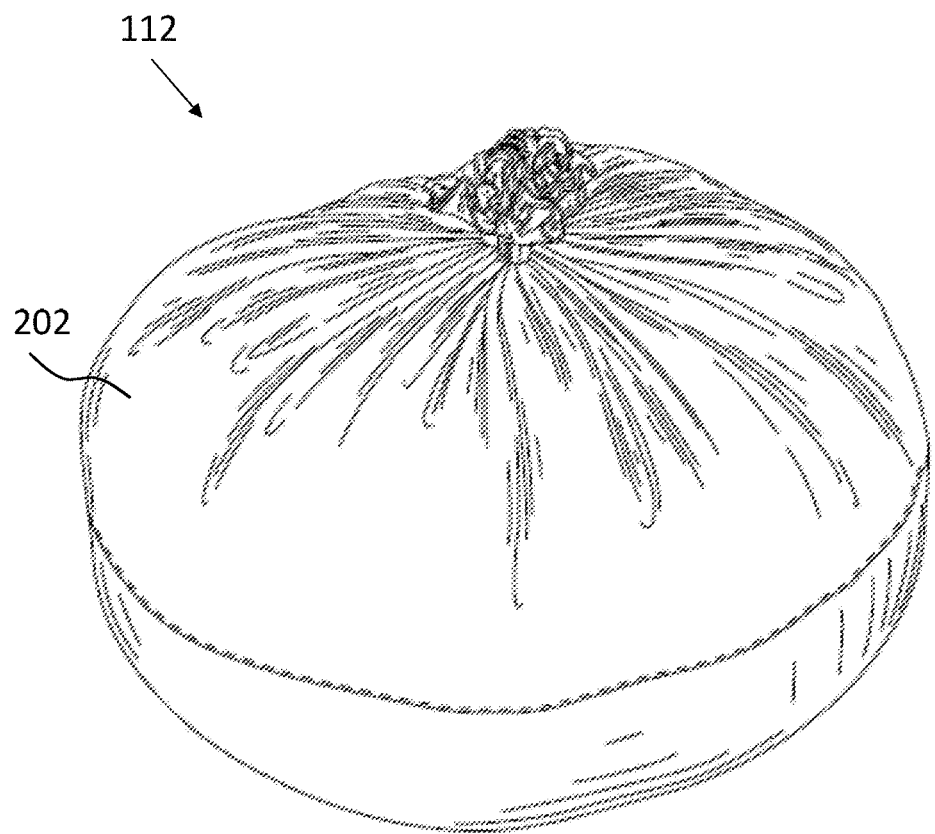
FIG. 12A and FIG. 12B are perspective and side illustrations of the media module of FIG. 4 in a free or resting state.
Figure 12B:
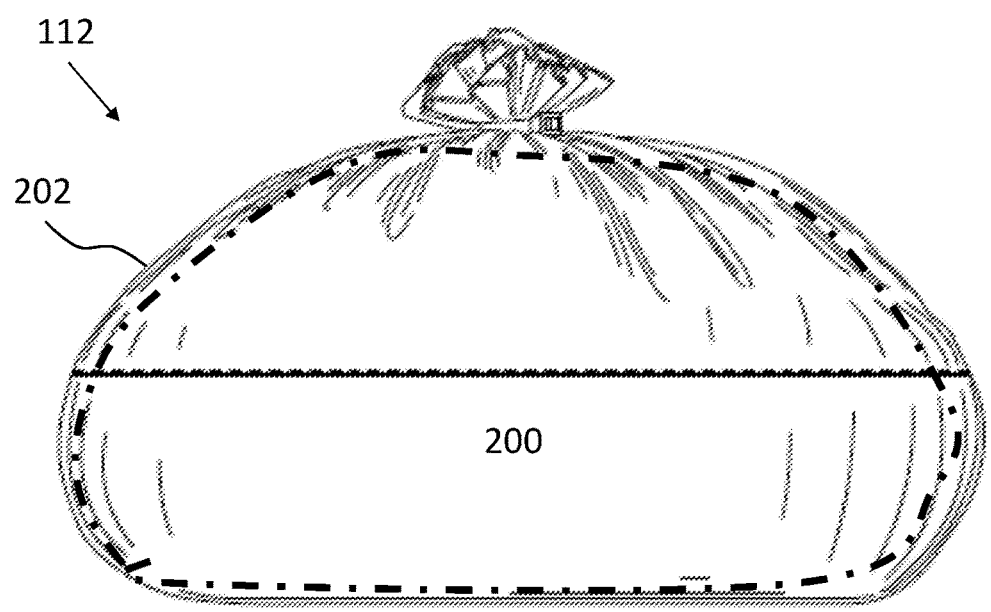
Figure 12C:
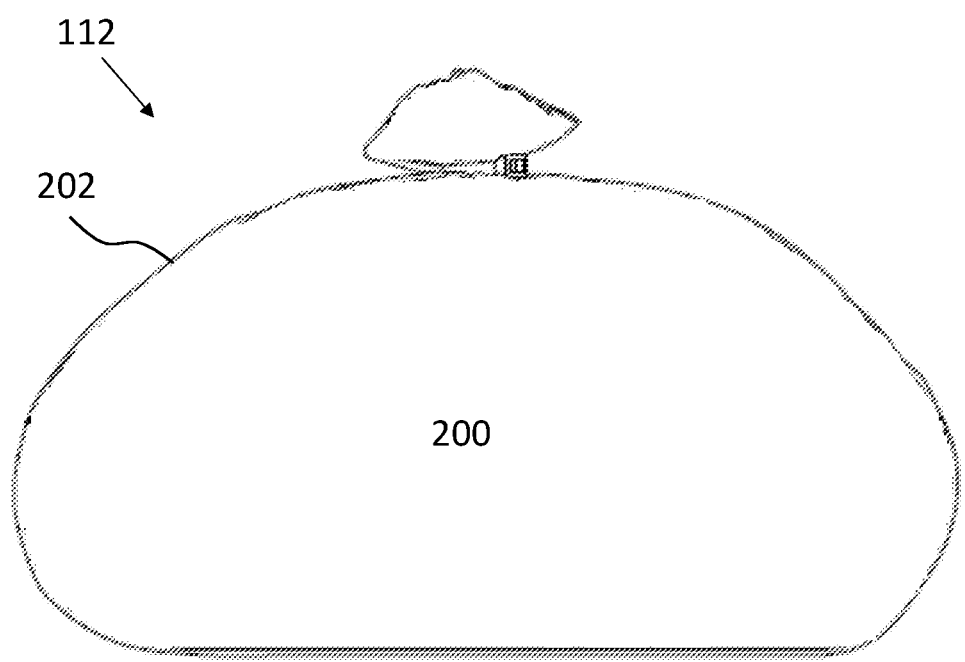
FIG. 12C is a cross-sectional view of the media module of FIG. 4 in a free or resting state.

To resolve this, when the operator desires to remove the cover assembly 126, the operator press the portion 150 of the lever 144. The depression of the portion 150 causes two actions to occur simultaneously as is shown in FIG. 11. First, the depression of the portion 150 overcomes the biasing force of the biasing member 172 via the cap 174, resulting in the valve body 176 translating in a direction towards the base 105. This displaces the head 180 from the surface 186 generating a gap 188 allowing pressure within the interior volume of the system 100 to vent via the hole 182. Second, the depression of the portion 150 rotates the release assembly 142 (in the counter-clockwise direction when viewed from the position of FIG. 11). This rotation moves the locking arm 162 and the projection 164 away from the side wall of the tank 104 to disengage the projection 124 from the slot 166. With the slot 166 disengaged from the projection 124, the cover assembly 126 may be rotated until the rib 120 disengages from the slot 128 allowing the cover assembly 126 to be lifted off of the tank 104.

Embodiments provided herein provide for a fluid conditioning system having a pressure relief arrangement. Embodiments provided herein further provide for a fluid conditioning system having a lock that couples a cover assembly to a tank. Still further embodiments provided herein further provide for a release assembly that simultaneously releases pressure from an internal volume and unlocks the cover assembly from the tank.

It should further be appreciated that while embodiments herein may refer to features with respect to an embodiment, this is for example purposes and it is contemplated that the features may be combined with other disclosed embodiments.

The term "about" is intended to include the degree of error associated with measurement of the particular quantity based upon the equipment available at the time of filing the application. For example, "substantially" or "about" can include a range around a given value.

It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A fluid purification device for purifying a fluid comprising:
    a tank having an outwardly protruding lock feature and a hollow interior for receiving a purification module;
    a cover sealingly coupled to the tank; and
    a release assembly pivotally coupled to the cover and engagable with the lock feature, the release assembly having a relief valve fluidly coupled to the hollow interior and a locking arm extending beyond a bottom surface of the cover, the locking arm including a lock member arranged adjacent the bottom surface of the cover, the release assembly being rotatable out of plane between a first position and a second position, wherein the lock member includes a slot and when the release assembly is in the first position, the relief valve is closed and the lock feature is arranged within the slot, and when the release assembly is in the second position, the relief valve is open and the lock member is rotated away from the tank such that the lock feature is remote from the slot.

2. The device of claim 1, wherein the relief valve opens and the lock member disengages simultaneously when the release assembly rotates from the first position to the second position.

3. The device of claim 1, wherein the lock feature is a rib on an exterior surface of the tank and the cover includes a slot on an inner surface.

4. The device of claim 1, wherein the release assembly further includes a lever coupled between the lock member and the relief valve, the lever having a portion operably coupled to the relief valve.

5. The device of claim 4, wherein the lock member includes a first projection extending from the locking arm.

6. The device of claim 5, wherein the lock feature is a second projection extending from the side of the tank.

7. The device of claim 6, wherein the first projection includes at least one angled surface.

8. The device of claim 1, wherein the relief valve includes a biasing member arranged to bias the release assembly into the first position.

9. The device of claim 8, wherein the relief valve includes a cap coupled to a valve body, the biasing member being disposed between the cap and the cover, the valve body extending through the cover and having a head that selectively seals with the cover.

10. A fluid purification system for purifying a fluid comprising:
    a tank having a first port, a hollow interior for receiving a purification module, and an outwardly protruding lock feature;
    a purification device disposed at least partially within the hollow interior;
    a cover sealingly coupled to the tank, the cover assembly having a second port fluidly coupled to the purification device; and
    a release assembly pivotally coupled to the cover, the release assembly having a relief valve fluidly coupled to the hollow interior and a locking arm extending beyond a bottom surface of the cover, the locking arm including a lock member arranged adjacent the bottom surface of the cover, the release assembly being rotatable out of plane between a first position and a second position, wherein the lock member includes a slot, and when the release assembly is in the first position, the relief valve is closed and the lock feature is arranged within the slot, and when the release assembly is in the second position, the relief valve is open and the lock member is rotated away from the tank such that the lock feature is remote from the slot.

11. The fluid purification system of claim 10, wherein the relief valve opens and the lock member disengages simultaneously when the release assembly rotates from the first position to the second position.

12. The fluid purification system of claim 10, wherein the lock feature protrudes from an exterior surface of the tank.

13. The fluid purification system of claim 12, wherein the release assembly further includes a lever coupled between the lock member and the relief valve, the lever having a portion operably coupled to the relief valve.

14. The fluid purification system of claim 13, wherein the lock member includes a first projection extending from the locking arm, the slot being formed in the first projection.

15. The fluid purification system of claim 14, wherein the lock feature is a second projection extending from the side of the tank.

16. The fluid purification system of claim 15, wherein the first projection includes at least one angled surface.

17. The fluid purification system of claim 10, wherein the relief valve includes a biasing member arranged to bias the release assembly into the first position.

18. The fluid purification system of claim 17, wherein the relief valve includes a cap coupled to a valve body, the biasing member being disposed between the cap and the cover, the valve body extending through the cover and having a head that selectively seals with the cover.

\* \* \* \* \*